(12) United States Patent
Blumenthal (10) Patent No.: US 8,578,962 B2
(45) Date of Patent: Nov. 12, 2013

(54) CONNECTION FITTING

(75) Inventor: Roland Blumenthal, Erfstadt (DE)

(73) Assignee: Gebr. Kemper GmbH & Co. KG Metallwerke, Olpe (DE)

( * ) Notice: Subject to any disclaimer, the term of this patent is extended or adjusted under 35 U.S.C. 154(b) by 162 days.

(21) Appl. No.: 12/668,522

(22) PCT Filed: Jul. 11, 2008

(86) PCT No.: PCT/EP2008/005677
§ 371 (c)(1),
(2), (4) Date: Apr. 5, 2010

(87) PCT Pub. No.: WO2009/007127
PCT Pub. Date: Jan. 15, 2009

(65) Prior Publication Data
US 2010/0193058 A1 Aug. 5, 2010

(30) Foreign Application Priority Data

Jul. 12, 2007 (DE) .................... 20 2007 009 832 U (51) Int. Cl.
*E03B 7/07* (2006.01)
(52) U.S. Cl.
USPC ............... 137/487; 137/599.11; 137/601.18; 137/601.19
(58) Field of Classification Search
USPC ............ 137/601.2, 599.13, 601.18, 599.11, 137/599.01, 601.19, 487, 487.5
See application file for complete search history.

(56) References Cited

U.S. PATENT DOCUMENTS

| | | | | | |
|---|---|---|---|---|---|
| 512,632 | A | * | 1/1894 | Thomson | 137/599.13 |
| 1,307,337 | A | * | 6/1919 | Bassett | 137/599.13 |
| 2,038,601 | A | * | 4/1936 | Quick | 137/601.18 |
| 2,046,474 | A | * | 7/1936 | Maggenti | 137/588 |
| 2,071,969 | A | * | 2/1937 | Diescher | 137/601.2 |
| 2,737,199 | A | * | 3/1956 | Ingram | 137/601.2 |

(Continued)

FOREIGN PATENT DOCUMENTS

| | | |
|---|---|---|
| DE | 3919074 A1 | 1/1991 |
| DE | 29622519 U1 | 3/1997 |

(Continued)

*Primary Examiner* — Eric Keasel
(74) *Attorney, Agent, or Firm* — Richard M. Klein; Fay Sharpe LLP (57) ABSTRACT

The present invention relates to a connection fitting for the connection of a ring with at least one consumer to a storey or rising main branch with inlet and outlet openings (2, 4) which can be connected to the branch and an intervening merge opening (34) for the ring main which is preceded in the flow direction (S) by a cross-section constriction (16). The present invention also relates to a water pipe system with at least one storey or rising main branch to which several ring mains are connected via separation and merge openings and a cross-section constriction provided between the separation and merge openings of the assigned ring main in the branch. The object of the present invention is to specify a connection fitting which leads to improved flow characteristics in the region of the ring main assigned to the connection fitting and to provide a water pipe system which fulfills the practical requirements in an improved manner. With this invention the object is solved by suggesting a connection fitting and a water pipe system of the prior known type, which are characterized in that they comprise means (12, 28) for varying the passage area of the cross-section constriction (V).

31 Claims, 4 Drawing Sheets

(56) References Cited

U.S. PATENT DOCUMENTS

| | | | |
|---|---|---|---|
| 3,734,121 A * | 5/1973 | Rowe et al. | 137/220 |
| 4,524,616 A * | 6/1985 | Drexel et al. | 73/203 |
| 4,872,475 A * | 10/1989 | Xiang-Wei | 137/493 |
| 5,099,881 A * | 3/1992 | Nakajima | 137/599.13 |
| 5,554,805 A * | 9/1996 | Bahrton | 73/202 |
| 5,622,203 A | 4/1997 | Givler et al. | |
| 6,247,495 B1 * | 6/2001 | Yamamoto et al. | 137/599.13 |

FOREIGN PATENT DOCUMENTS

| | | |
|---|---|---|
| DE | 19803901 | 8/1999 |
| JP | 58137678 | 8/1983 |
| WO | WO 02/103123 A2 | 12/2002 |
| WO | WO 02/103123 A3 | 12/2002 |

* cited by examiner

CONNECTION FITTING

The present invention relates to a connection fitting for the connection of a ring main with at least one consumer to a storey or rising main branch with inlet and outlet openings which can be connected to the branch and an intervening merge opening for the ring main which is preceded in the flow direction by a cross-section constriction.

In the field of potable water technology, in particular for the prevention of microbial contamination in potable water pipes, the provision is known of a connection fitting of the aforementioned type which is positioned after a branch fitting in the flow direction of the branch. At the branch fitting a partial flow of the branch is led off and passed via a ring main to one or several consumers. The ring main opens into the merge opening of the connection fitting. In front of the merge opening in the flow direction is a cross-section constriction, which acts as a type of nozzle and causes a pressure difference between the junction and the merge opening, through which with a flow in the branch, a flow in the ring main is also produced. For the purpose of this invention, a branch is taken to be any main pipe, irrespective of whether it extends within a storey and within the storey several plumbing units are arranged one behind the other, each supplied by a ring main with drinking or service water, or as a rising main branch, for example in several stories, connecting plumbing units together which are positioned one above the other.

From DE 39 19 074, for example, a connection fitting of the aforementioned type is known as part of a high purity water supply system. With this prior known connection fitting the ring main flow passed back from the ring main into the branch is introduced at an angle of about 90 degrees to the main flow direction into the connection fitting. The main flow direction is taken to be that direction in which the main flow runs, i.e. the flow within the branch. The connection fitting known from DE 39 19 074 has a cross-section constriction which acts as a type of venturi nozzle and causes a pressure in the region of the merge opening, which is lower than the pressure in the branch, so that in relation to a point of the fitting in front of the cross-sectional constriction in the flow direction, for example at the inlet opening, an effective pressure loss occurs.

A further connection fitting is known from U.S. Pat. No. 5,622,203. The connection fitting forms part of a hot-water circulation system and connects the hot-water circulation pipe to a public potable water supply network. The connection fitting ensures that with the extraction of hot water at an extraction point connected to the system hot water is directly available. The connection fitting acts as a type of venturi nozzle which comprises a cross-section constriction, preceded in the flow direction by a merge opening in the circulation pipe, realised by a gap and a cross-section expansion positioned after the merge opening in the flow direction. Due to the venturi effect, a lower pressure is produced in the region of the merge opening (of the gap), through which suction is generated, which allows the water from the circulation pipe to flow via the gap at an angle approaching 90° into the circulation pipe again, wherein the circulating water can be mixed with the potable or service water from the public potable water supply main.

Practical experiments by the applicant have shown that in particular with several ring mains arranged one behind the other in the direction of the main flow, particular attention must be paid to the dynamic flow design. Thus, not only should the pressure drop within a ring main be minimised, but also too the pressure drop of each individual connection fitting arranged one behind the other in the main flow direction should be matched such that the desired flushing effect of the ring mains can be reliably ensured to cause flushing of all ring mains in the branch during water extraction by a consumer. Here, in particular it should be ensured that the pressure difference is maintained as low as possible for each individual connection fitting without the desired through-flow of the ring main stopping with a flow in the branch, for example due to water extraction on a ring main following this ring main in the main flow direction.

The present invention provides for a connection fitting of the type mentioned in the introduction, which leads to improved flow relationships in the region of the ring main assigned to the connection fitting. Furthermore, with the present invention a water pipe system with at least one storey or rising main branch, to which several ring mains are connected via separation and merge openings, and a cross-section constriction provided in the branch between the separation and merge openings of the assigned ring main, are specified, which fulfil the practical requirements in an improved manner.

This object is solved according to the invention in the first aspect by a connection fitting having the features as defined in Claim 1.

From the present invention it follows that the flow in the ring main, which is caused by the pressure difference, can be varied by the nozzle-type cross-section constriction in the branch between the separation opening and the merge opening by a variable passage area of the cross-section constriction, and namely in particular in dependence of the volume flow in the branch, i.e. in dependence of the effective pressure within the branch. With the embodiment according to the invention, in dependence of the position of a means of varying the cross-section constriction, any flow characteristic, in particular any flow division, i.e. the distribution of partial flows by the ring main on one hand and the branch on the other, can be achieved. To achieve this, the means of varying the profile area of the cross-section constriction can be controlled by a motor. Any means of varying the passage area is conceivable. The profile contraction can, for example, be realised by a moving throttle element, which is relative to a stationary cross-section constriction provided between the inlet and outlet openings in the branch.

According to a preferred further development, this throttle element is held in its initial position, which here gives the position at which the maximum possible cross-section constriction in the branch is obtained, in the region of the cross-section constriction with the formation of a leakage flow gap. This preferred embodiment ensures that even with relatively low volume flow in the branch a partial flow passes through the branch so that at no time can the total flow in the branch occur solely through the ring mains and with the bypass of that longitudinal part, which is located between the separation and merge openings of the respective ring mains, which would lead to microbial contamination of these flow sections. The aforementioned slight flows in the branch can, for example, then be set if the branch is opened also when not in use, for example, by a valve at one end, in order to flush the respective branch and to drain stagnant or optionally microbially contaminated water.

According to an alternative embodiment, this effect can also be achieved in that a bypass permitting the leakage flow is provided in the region of the cross-section constriction. With this embodiment the throttle element can be located for sealing on the cross-section constriction without the leakage flow being impaired. Consequently, according to the further development of the present invention only a means of leakage has to be provided which facilitates the corresponding leakage flow through the branch, i.e. a leakage flow excluding the ring main. With the use of a throttle as the means of varying the passage area, the leakage should be dimensioned such that up to an initial lifting of the throttle element from the flow constriction, which is provided stationary with respect to a connection housing, adequate flow both through the ring main and also through the uninterrupted branch is provided. Any small flow within the branch should accordingly lead to a through-flow and thus a flushing both of the ring main and of the branch.

According to a preferred further development of the present invention the cross-section constriction, i.e. the embodiment generally formed stationary to the housing of the connection fitting, is formed by a cone, the front surface of which forms a nozzle in the flow direction, i.e. the narrowest cross-section in the branch, and the other conical surface of which is preferably formed as a diffuser and forms a contact base for a conical counter surface, formed by the throttle element. For the formation of a certain conical surge characteristic the conical counter surface of the throttle element and the conical surface of the double cone must not have the same contour and/or slope. On the contrary both surfaces can have contours and/or slopes which are different from one another.

To influence the respective flow proportions through the ring main on one hand and through the branch on the other hand, the throttle element is preferably held under tension by a spring element, and namely such that the throttle element contacts the cross-section constriction in the initial position. The spring characteristic of the spring element can be adapted to take into account the desired partial flows, and namely dependent on the pressure or flow relationships in the branch with changing total flow.

According to a further preferred embodiment of the present invention, the means also has a guide element which retains the throttle element for movement. The guide element is preferably supported on the internal circumferential surface of the housing of the connection fitting, so that the throttle element is held and guided in a defined manner within the housing. With regard to a symmetrical flow through the branch, also in the region of the cross-section constriction, in a further preferred embodiment of the present invention it is suggested that the guide element and the throttle element are aligned coaxially with respect to one another and that their longitudinal axes align with the longitudinal axis of the branch.

According to a further preferred embodiment of the present invention an insertion part is provided, which as well as the guide element also forms a constriction section positioned in front of it in the flow direction, which forms the cross-section constriction. Accordingly, the means for varying the passage area of the cross-section constriction can be installed and realised in the form of a standardised insertion part in the branch. The means can be used accordingly for retrofitting in normal, cylindrical branch pipes from which ring mains branch off. The insertion part can here be inserted into a piece of pipe in the branch.

In particular with the initial equipping of a connection fitting it is preferable to provide locking means on the external circumferential area of the insertion part, which are preferably spaced with respect to one another in the circumferential direction. The insertion part is held within the fitting housing with these locking means. The locking means are preferably formed by latching lugs which engage in latching grooves formed on the internal circumferential surface of the fitting housing. Latching grooves are taken to mean recesses which are provided in the circumferential direction spaced from one another, each interacting with a single latching lug. Of course, latching grooves of this nature can be realised, formed together as a recess running around the internal circumference of the fitting housing.

According to a further preferred embodiment of the present invention the guide element extends up to the region of the merge opening, i.e. partially covering the merge opening in the region of the connection fitting and forming a ring-main flow outlet, which passes through the guide section so that the ring main flow can be passed back through the guide element into the main flow in the branch.

The further development given in Claim 13 offers the possibility of having a so-called inliner within the connection fitting, which is normally provided as a circulation pipe for a pipe-in-pipe circulation pipe and normally carries hot water to the consumer. Accordingly, the connection fitting according to this further development is particularly suitable for a hot-water circulation system.

The inner pipe is used according to a further preferred embodiment to guide the throttle element for movement. Here, for example, between the external circumferential surface of the inner pipe and the movable throttle element positioned over it, a leakage flow can be permitted which also passes through the passage area of the cross-section constriction when the throttle element is located in its initial position.

To realise the ring main flow outlet, according to a further preferred embodiment of the present invention it is suggested that the guide element is provided with several supporting ridges on at least one of its face-side ends, which specify the external circumferential area and extend in an axial direction. Adjacent supporting ridges in the circumferential direction form a gap, through which the introduced ring main flow can pass the guide element in the radial direction with respect to the longitudinal axis of the branch. On the face-side ends the corresponding supporting ridges are preferably formed in a funnel shape by means of which insertion of the inner pipe is simplified during the assembly of the connection fitting.

Claims 16 and 17 specify preferred flow dimensions of the connection fitting which have proven to be suitable as further developments in practice.

The object is solved with regard to the water pipe system by a system having the features as defined in Claim 18. This comprises means for varying the passage area of the cross-section constriction. These need not necessarily be formed as part of a connection fitting which forms the merge opening. However, these means are assigned to the cross-section constriction, i.e. between the respective separation opening and the respective merge opening of an assigned ring main.

Further advantages and details of the present invention are given in the following description of an embodiment in conjunction with the drawing.

This shows the following.

Figure 1:
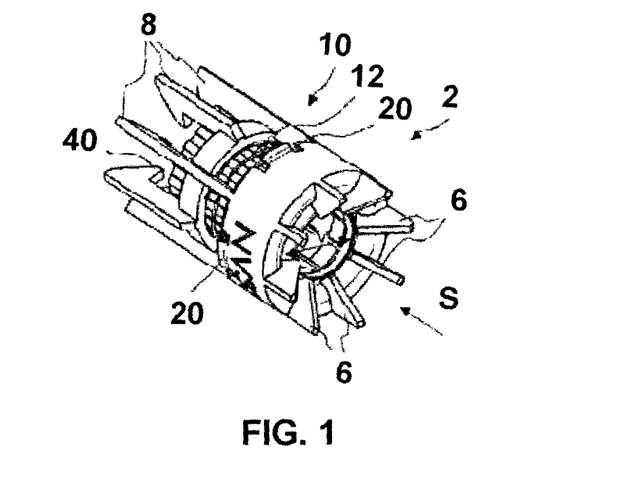
FIG. 1 a perspective view of an insertion part of the embodiment with the flow input in the initial position of the throttle element.
Figure 2:
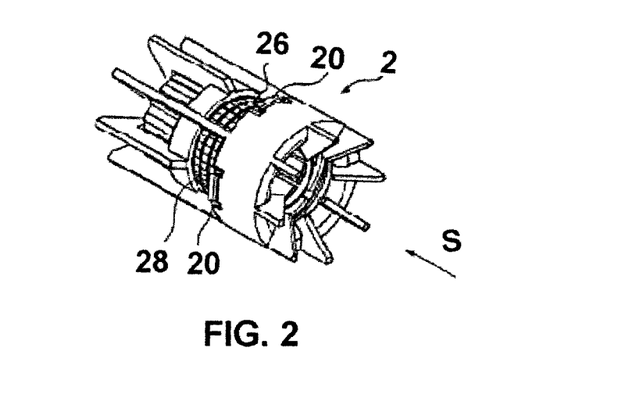
FIG. 2 a perspective side view according to FIG. 1 in the fully open position of the insertion part.
Figure 3:
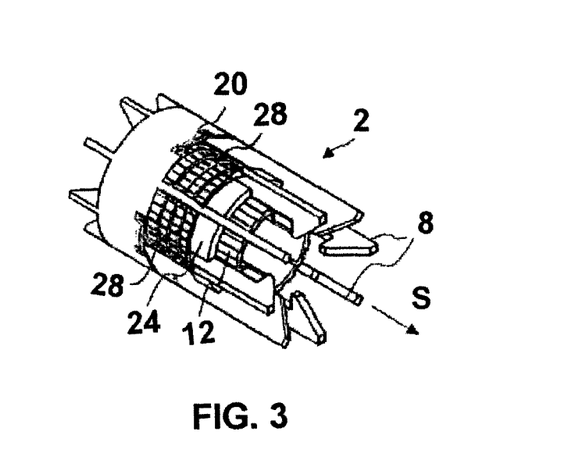
FIG. 3 a perspective side view of the insertion part illustrated in FIG. 1 with the flow output.
Figure 4:
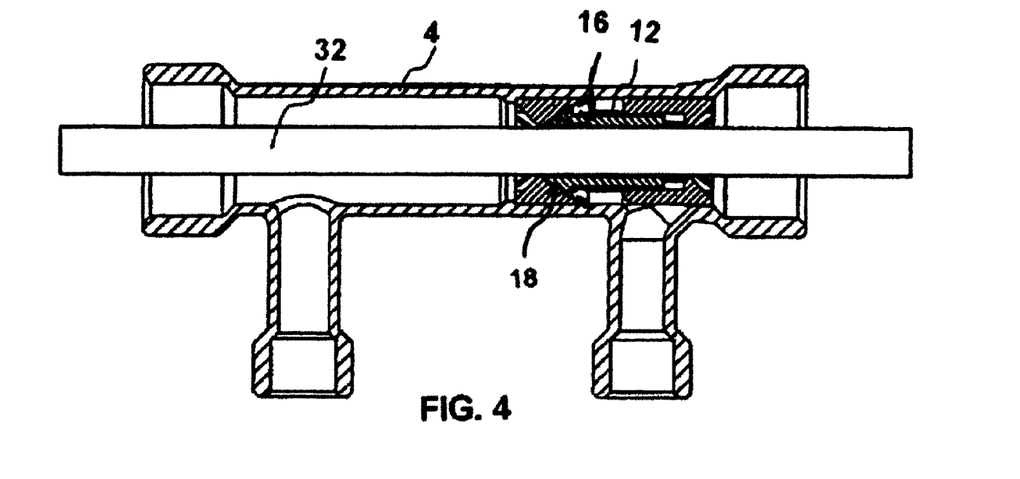
FIG. 4 a longitudinal section through a part of a branch in the region of the connection fitting with a throttle element in the initial position.
Figure 5:
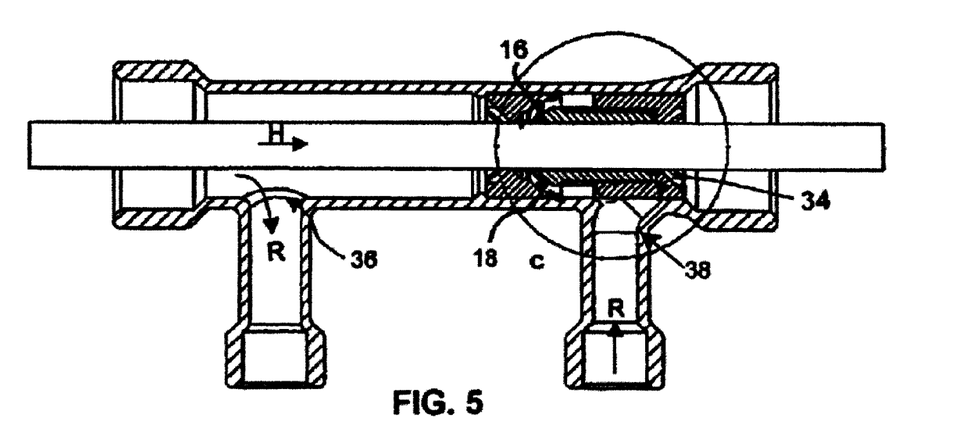
FIG. 5 the view illustrated in FIG. 4 with a fully open throttle element.

FIGS. 1 to 3 illustrate an insertion part 2, which can be formed from metal or plastic and which is formed with a cylindrical external circumferential surface essentially corresponding to a cylindrical internal circumferential surface of a fitting housing, which is illustrated in FIGS. 4 and 5 where it is identified with the reference numeral 4. The arrow S drawn in FIGS. 1 to 3 indicates the flow direction of a main flow passing through the branch, the said main flow being identified in FIGS. 4 and 5 with the reference letter H. The flow through the ring main is identified with the reference letter H.

At its front end in the flow direction the insertion part 2 has several ridges 6 distributed around the circumference, which continue the cylindrical external circumferential surface and which at their free end are aligned inwards in a funnel shape. The end remote from the flow also has a corresponding embodiment. Here, the ridges are identified with the reference numeral 8.

This region of the insertion part 2 forms a guide element 10 for a throttle element 12. Between the front ridges 6 and the rear ridges 8 the insertion part 2 has an annular section 14, the internal circumferential surface of which is formed as a conical surface 16, which interacts with a conical counter surface 18 of the throttle element 12. In the sectioned illustration a nozzle cross-section formed by the annular section, which forms a cross-section constriction V in relation to the main flow H, is protruded from radially inwards by the ridges 6. In other words the nozzle has at its narrowest point a larger diameter than the ridges 6 which are drawn inwards and which form a limit stop for the throttle element 1.

In the region of the rear end of the annular section 14 in the flow direction several latching lugs 20 are formed on the external circumferential surface, which engage the latching grooves 22, which are recessed on the internal circumferential surface of the fitting housing 4. Downstream from the latching lugs 20 and held by every second of the rear ridges 8 a ring 24 is provided, which comprises and circumferentially guides the throttle element 12, and forms a supporting surface 26 for a spring element 28, which extends between this ring 24 and an annular surface 30 of the throttle element 12, which follows in the flow direction immediately after the conical counter surface 18 of the throttle element 12.

In the illustrated embodiment the conical inward projecting free ends of the ridges 6, 8 form a funnel shaped opening, which facilitates the insertion of an inner pipe 32 of an inliner illustrated in FIGS. 4 and 5. This funnel shaped opening has a diameter approximately corresponding to the outer diameter of the inner pipe 32. The inner diameter of the nozzle at its narrowest point is about 15 to 25% larger than the diameter of the funnel shaped opening.

The inner pipe 32 passes through a central hole in the throttle element 12. This is here guided by the internal circumferential surface of the ring 24 and the ridges following in the flow direction S. Selected ridges can engage axial grooves which can be formed on the external circumferential surface of the throttle element 12, by means of which the throttle element 12 is prevented from turning.

Figure 6:
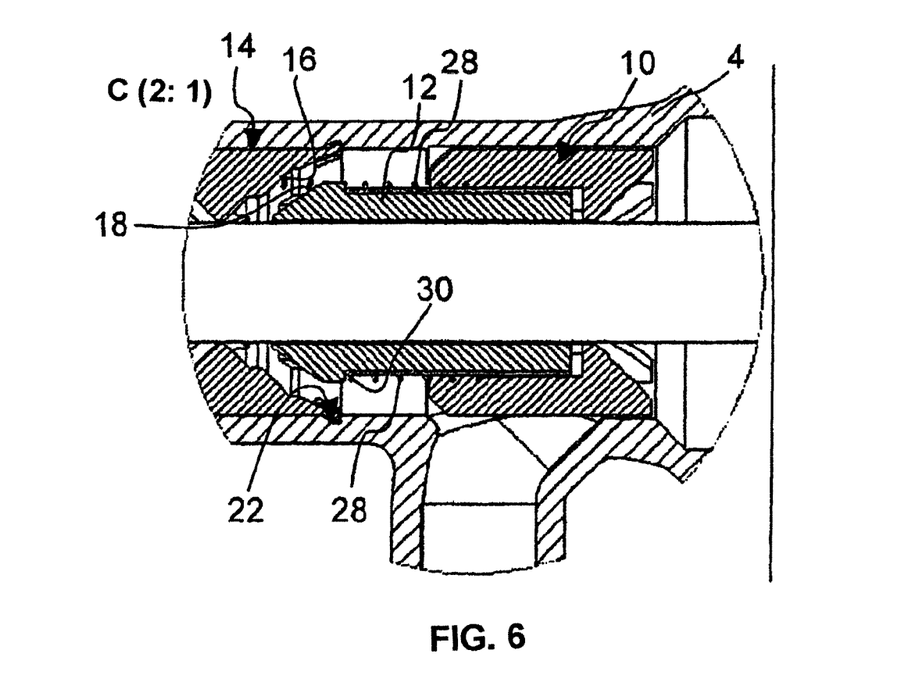
FIG. 6 the detail C circled in FIG. 5 in an enlarged illustration.

As can be seen from FIGS. 4 to 6, the insertion part 2 with its guide element 10 is located in the region of a merge opening 34 of a ring main, which is not illustrated in further detail and which leaves the branch with a separation opening upstream of the insertion part 2, leading to one or several consumers, for example a plumbing unit in a hotel, and is passed back into the branch in the region of the connection fitting. In this respect the circumferentially spaced rear ridges 8 form a ring-main flow outlet 38, through which the ring main flow can flow radially inwards to combine with the main flow H.

In the initial position illustrated in FIG. 4, where the conical counter surface 18 of the throttle element 12 contacts the conical surface 16 of the cylindrical section 14, a leakage flow gap remains between the adjacent conical surfaces 16, 18, so that with a pressure difference acting over the maximum cross-section constriction a certain leakage flow is possible even with contacting conical surfaces 16, 18. The cross-section constriction can also be formed such that with minimum pressure difference the main flow H is cut off and the remaining volume flow passes solely through the ring main.

With increasing pressure difference over the cross-section constriction the throttle element 14 is forced backwards in the flow direction against the force of the spring element 28. In this way the cross-section constriction V is enlarged until the throttle element is brought up against the face-side end of the guide formed by the guide element 10. Here, this is formed by hook shaped radial protrusions 40 from the rear ridges 8.

Figure 7:
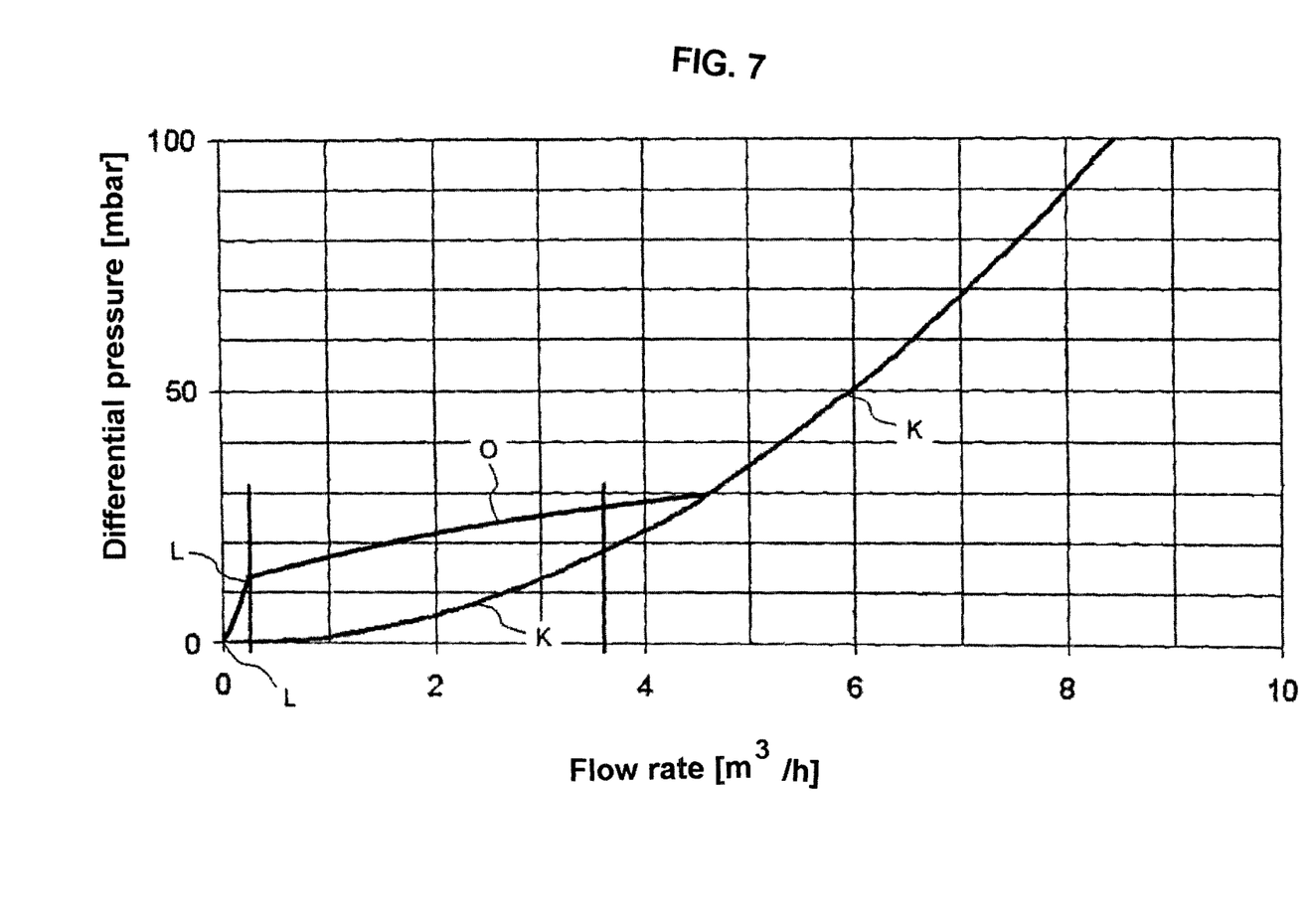
FIG. 7 a graph comparing the flow characteristic in the ring main in relationship to the pressure difference between the separation and merge openings.

The flow characteristic in the ring main produced in this manner is illustrated in FIG. 7 in comparison to a conventional flow characteristic K of a constant throttle. With a very small pressure difference in the branch of about 10 to 20 mbar a leakage flow, identified with L, occurs. With pressure changes in this region a flow curve corresponding to a conventional throttle arises. However, this is due to a constant flow cross-section, which is formed by the leakage flow gap.

At higher pressure differences the relative movement between the throttle element 12 and the insertion part 2 begins, which is possible up to a pressure difference of about 30 mbar. A higher through-flow in the ring main is produced, overall comparing to a nozzle with a constant cross-section constriction. It is only at a pressure difference above 30 mbar that the throttle element 12 reaches its end position, i.e. it contacts the end surface of the guide, so that a further increase in the pressure difference between the separation opening and the merge opening in the ring main leads to a conventional flow curve K. In a pressure difference range where the throttle element increasingly moves away from the conical surface 14, the flow curve is approximately linear. There is a correlation with which the pressure difference and the flow in the ring main correlate as follows: $\Delta p \sim Q^{2/3}$ with $\Delta p$=pressure difference between the separation opening and merge opening and Q=flow rate in $m^3/h$ in the ring main. This characteristic is identified with D in FIG. 7. Below this region, i.e. in the region of the leakage flow and with a pressure difference of below about 13 mbar the relationship becomes $\Delta p \sim Q^2$. As already indicated above, this region is identified with L. Above this section of the curve D a corresponding dependence arises, but it is due to the now maximum cross-section constriction with the maximum withdrawal of the throttle element 12 with a significantly smaller rise in the flow rate in the ring main for increasing pressure difference (curve K).

The continuous curve K from the origin of the graph according to FIG. 7 at the zero point corresponds otherwise to the conventional characteristic of a nozzle for generating forced flow in the ring main, for example according to DE 39 19 074.

LIST OF REFERENCE NUMERALS

2 Insertion part
4 Fitting housing
6 Ridges
8 Ridges
10 Guide element

12 Throttle element
14 Annular section
16 Conical surface
18 Conical counter surface
20 Latching lugs
22 Latching grooves
24 Ring
26 Supporting surface
28 Spring element
30 Annular surface
32 Inner pipe
34 Merge opening
36 Separation opening
38 Ring-main flow outlet
40 Radial protrusions of the ridges 8
D Flow characteristic for variable passage area
K Conventional flow characteristic with constant passage area
H Main flow
L Flow characteristic for leakage flow
R Ring main flow
S Flow
V Cross-section constriction

The invention claimed is:

1. A connection fitting comprising a housing having a branch located between an inlet opening and an outlet opening, a separation opening leading to an associated ring main, a merge opening leading away from the associated ring main, a cross-section constriction between the inlet opening and the merge opening that forms a conical surface, and a means for varying a passage area of the cross-section constriction based on a pressure difference acting over the cross-section constriction;

wherein when the pressure difference ($\Delta p$) between the separation and merge openings is from about 10 mbar to 30 mbar, the pressure difference ($\Delta p$) has the following relationship:

$$\Delta p \sim Q^n,$$

where $0.6 \leq n \leq 1$, and Q is the flow rate in m$^3$/h in the ring main.

2. The connection fitting of claim 1, wherein the means for varying comprises a movable throttle element, which can move relative to the cross-section constriction (V).

3. The connection fitting of claim 2, wherein when the throttle element contacts the cross-section constriction, a leakage flow (L) through the cross-section constriction is possible.

4. The connection fitting of claim 2, wherein the throttle element forms a conical counter surface that interacts with the conical surface of the cross-section constriction.

5. The connection fitting of claim 2, wherein the throttle element is held by a spring element against the cross-section constriction.

6. The connection fitting of claim 2, wherein the means for varying further comprises a guide element which movably holds the throttle element.

7. The connection fitting of claim 6, wherein the guide element and the throttle element are coaxial and are aligned along a longitudinal axis of the branch.

8. The connection fitting of claim 7, wherein the guide element is formed as part of an insertion part which forms the cross-section constriction.

9. The connection fitting of claim 8, wherein an external circumference of the insertion part comprises locking means for holding the insertion part in the housing of the connection fitting.

10. The connection fitting of claim 8, wherein the insertion part comprises a plurality of supporting ridges on a face-side end, the ridges defining an external circumferential surface of the insertion part and extending in the axial direction, and the ridges forming a funnel shape.

11. The connection fitting of claim 6, wherein the guide element covers the merge opening, and wherein an outer wall of the guide element has at least one ring main flow outlet.

12. The connection fitting of claim 2, wherein the throttle element has a through hole running in a longitudinal direction, through which an inner pipe can be passed.

13. The connection fitting of claim 12, further comprising an inner pipe that movably guides the throttle element.

14. The connection fitting of claim 1, wherein $n=\frac{2}{3}$.

15. A connection fitting comprising a housing having a branch located between an inlet opening and an outlet opening, a separation opening leading to an associated ring main, a merge opening leading away from the associated ring main, a cross-section constriction between the inlet opening and the merge opening, and means for varying a passage area of the cross-section constriction, wherein the means for varying comprises a movable throttle element, which can move relative to the cross-section constriction (V), wherein the means for varying further comprises a guide element which movably holds the throttle element, wherein the guide element and the throttle element are coaxial and are aligned along a longitudinal axis of the branch, wherein the guide element is formed as part of an insertion part which forms the cross-section constriction, wherein an external circumference of the insertion part comprises locking means for holding the insertion part in the housing of the connection fitting, and wherein the locking means is formed by a plurality of latching lugs spaced from one another in a circumferential direction of the insertion part, and wherein latching grooves are formed on an internal circumferential surface of the housing to engage the latching lugs.

16. A water pipe system having a main branch to which an associated ring main leading to one or several consumers is connected via a separation opening and a merge opening of a connection fitting, the connection fitting further comprising a housing having a branch located between an inlet opening and an outlet opening, a cross-section constriction between the inlet opening and the merge opening, and a means for varying a passage area of the cross-section constriction based on a pressure difference acting over the cross-section constriction, wherein when the pressure difference ($\Delta p$) between the separation and merge openings is from about 10 mbar to 30 mbar, the pressure difference ($\Delta p$) has the following relationship:

$$\Delta p \sim Q^n,$$

where $0.6 \leq n \leq 1$, and Q is the flow rate in m$^3$/h in the ring main.

17. The water pipe system of claim 16, wherein $n=\frac{2}{3}$.

18. A connection fitting comprising a housing having a branch located between an inlet opening and an outlet opening, a separation opening leading to an associated ring main, a merge opening leading away from the associated ring main, a cross-section constriction between the inlet opening and the merge opening, and a means for varying a passage area of the cross-section constriction based on a pressure difference acting over the cross-section constriction;

wherein when the pressure difference ($\Delta p$) between the separation and merge openings is from about 10 mbar to 30 mbar, the pressure difference ($\Delta p$) has the following relationship:

$$\Delta p \sim Q^n,$$

where $0.6 \leq n \leq 1$, and Q is the flow rate in m$^3$/h in the ring main.

19. The connection fitting of claim 18, wherein the means for varying comprises a movable throttle element, which can move relative to the cross-section constriction (V).

20. The connection fitting of claim 19, wherein when the throttle element contacts the cross-section constriction, a leakage flow (L) through the cross-section constriction is possible.

21. The connection fitting of claim 19, wherein the throttle element forms a conical counter surface that interacts with the cross-section constriction.

22. The connection fitting of claim 19, wherein the throttle element is held by a spring element against the cross-section constriction.

23. The connection fitting of claim 19, wherein the means for varying further comprises a guide element which movably holds the throttle element.

24. The connection fitting of claim 23, wherein the guide element and the throttle element are coaxial and are aligned along a longitudinal axis of the branch.

25. The connection fitting of claim 24, wherein the guide element is formed as part of an insertion part which forms the cross-section constriction.

26. The connection fitting of claim 25, wherein an external circumference of the insertion part comprises locking means for holding the insertion part in the housing of the connection fitting.

27. The connection fitting of claim 25, wherein the insertion part comprises a plurality of supporting ridges on a face-side end, the ridges defining an external circumferential surface of the insertion part and extending in the axial direction, and the ridges forming a funnel shape.

28. The connection fitting of claim 23, wherein the guide element covers the merge opening, and wherein an outer wall of the guide element has at least one ring main flow outlet.

29. The connection fitting of claim 19, wherein the throttle element has a through hole running in a longitudinal direction, through which an inner pipe can be passed.

30. The connection fitting of claim 29, further comprising an inner pipe that movably guides the throttle element.

31. The connection fitting of claim 18, wherein $n=\frac{2}{3}$.

* * * * *

UNITED STATES PATENT AND TRADEMARK OFFICE
CERTIFICATE OF CORRECTION

PATENT NO. : 8,578,962 B2  Page 1 of 1
APPLICATION NO. : 12/668522
DATED : November 12, 2013
INVENTOR(S) : Roland Blumenthal It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 249 days.

Signed and Sealed this
Twenty-second Day of September, 2015

Michelle K. Lee
*Director of the United States Patent and Trademark Office*